(12) United States Patent
Navarro (10) Patent No.: US 11,980,953 B1
(45) Date of Patent: May 14, 2024

(54) CUTTER ASSEMBLY

(71) Applicant: Multiple Cutter LLC, Clarkdale, AZ (US)

(72) Inventor: Ramon Navarro, Clarkdale, AZ (US)

(73) Assignee: MULTIPLE CUTTER LLC, Clarkdale, AZ (US)

( * ) Notice: Subject to any disclaimer, the term of this patent is extended or adjusted under 35 U.S.C. 154(b) by 0 days.

(21) Appl. No.: 18/143,039

(22) Filed: May 3, 2023

Related U.S. Application Data (63) Continuation-in-part of application No. PCT/US2023/011370, filed on Jan. 23, 2023.

(60) Provisional application No. 63/420,581, filed on Oct. 29, 2022.

(51) Int. Cl.
  *B23C 5/22* (2006.01)
  *B23C 5/04* (2006.01)

(52) U.S. Cl.
  CPC .............. *B23C 5/22* (2013.01); *B23C 5/04* (2013.01); *B23C 2210/168* (2013.01); *B23C 2240/32* (2013.01)

(58) Field of Classification Search
  CPC ....... B23C 5/22; B23C 5/04; B23C 2210/168; B23C 2240/32; Y10T 407/19; Y10T 407/1936; Y10T 407/23
  See application file for complete search history.

(56) References Cited

U.S. PATENT DOCUMENTS

| 290,923 | A | * | 12/1883 | Pope | B27G 15/00 407/45 |
| 363,753 | A | * | 5/1887 | Mahaffey | B27G 13/10 144/229 |
| 466,869 | A | * | 1/1892 | Gerdom | 408/233 |
| 1,106,966 | A | * | 8/1914 | Pauli | B23B 51/00 76/108.1 |
| 1,273,752 | A | * | 7/1918 | Ebert | B23D 77/048 408/179 |

(Continued)

FOREIGN PATENT DOCUMENTS

| DE | 102006009801 A1 * | 9/2007 | ............. B23B 51/02 |
| EP | 0059513 B2 | 12/1993 | |

(Continued)

*Primary Examiner* — Sara Addisu
(74) *Attorney, Agent, or Firm* — Invention To Patent Services; Alex Hobson (57) ABSTRACT

A cutter assembly is configured to interchange a cutter bit and has a plurality of retaining features to secure the cutter bit to ensure positive retention and alignment along a rotational axis. A cutter bit is retained within a slot of the retainer component and the retainer component is coupled to a chuck component. The retainer component may be detachably attachable to the chuck component by external threads that are configured to thread into the internal threads of the chuck component. The cutter bit may be retained in the slot by a threaded retainer that extends through one side of the retainer component, through a cutter aperture in the cutter bit, through the slot and into a threaded retainer aperture in the opposing side of the retainer component. The threaded retainer is configured to extend orthogonally to the slot to pull the first side of the retainer component to the second side and pinch or compress against the cutter bit therein.

25 Claims, 10 Drawing Sheets

(56) References Cited

U.S. PATENT DOCUMENTS

| | | | | |
|---|---|---|---|---|
| 1,342,031 A | * | 6/1920 | Skibinski | B23B 27/1696 |
| | | | | 407/67 |
| 1,948,648 A | | 2/1934 | Buchmuller | |
| 2,149,618 A | | 3/1939 | Misuraca | |
| 2,455,973 A | * | 12/1948 | Boyd, Jr. | B23D 13/00 |
| | | | | 407/102 |
| 2,591,614 A | | 3/1950 | Sacrey | |
| 2,621,548 A | * | 12/1952 | Williams | B23B 51/00 |
| | | | | 408/233 |
| 2,673,716 A | * | 3/1954 | Avery | E21B 17/22 |
| | | | | 175/420.1 |
| 2,937,545 A | * | 5/1960 | Rauer | B23B 51/107 |
| | | | | 408/231 |
| 2,959,109 A | * | 11/1960 | Buchan | B23B 51/102 |
| | | | | 408/187 |
| 3,261,095 A | * | 7/1966 | Nelson | A47L 1/16 |
| | | | | 403/321 |
| 3,343,431 A | * | 9/1967 | Boyer | B23C 5/24 |
| | | | | 407/104 |
| 3,834,829 A | * | 9/1974 | Munro | B23C 5/2472 |
| | | | | 408/239 R |
| 3,856,427 A | * | 12/1974 | Lovendahl | B23B 29/0341 |
| | | | | 408/239 R |
| 3,991,454 A | | 11/1976 | Wale | |
| 4,231,691 A | | 11/1980 | Pape et al. | |
| 4,541,757 A | * | 9/1985 | Reynolds | B23C 5/02 |
| | | | | 407/53 |
| 4,614,463 A | * | 9/1986 | Hughes | B23C 5/22 |
| | | | | 407/62 |
| 4,652,182 A | | 3/1987 | Mellert | |
| 4,826,090 A | * | 5/1989 | Orphall | B02C 13/2804 |
| | | | | 403/381 |
| 4,830,548 A | * | 5/1989 | Kandarian | B23B 51/102 |
| | | | | 30/310 |
| 5,108,234 A | * | 4/1992 | Stojanovski | B23C 5/1036 |
| | | | | 407/113 |
| 5,313,680 A | | 5/1994 | Ringler | |
| 5,370,023 A | * | 12/1994 | Morgan | B23B 27/06 |
| | | | | 82/158 |
| 5,378,076 A | | 1/1995 | D'Andrea | |
| 5,415,462 A | | 5/1995 | Massa | |
| 5,593,253 A | | 1/1997 | Pozzo | |
| 5,735,649 A | * | 4/1998 | Boscarino | B23C 5/24 |
| | | | | 408/173 |
| 5,899,642 A | | 5/1999 | Berglow et al. | |
| 5,904,448 A | * | 5/1999 | Lee | B23C 5/1045 |
| | | | | 407/53 |
| 6,071,045 A | * | 6/2000 | Janness | B23C 3/12 |
| | | | | 407/65 |
| 6,113,195 A | | 9/2000 | Mercier et al. | |
| 6,158,927 A | * | 12/2000 | Cole | B23C 5/1036 |
| | | | | 407/65 |
| 6,186,199 B1 | * | 2/2001 | Gittel | B23C 5/006 |
| | | | | 144/228 |
| 6,394,711 B1 | * | 5/2002 | Brosius | B23C 5/10 |
| | | | | 408/239 R |
| 6,582,165 B1 | * | 6/2003 | Baba | B23C 5/109 |
| | | | | 407/42 |
| 6,637,985 B2 | | 10/2003 | Pokolm | |
| 6,984,093 B1 | * | 1/2006 | Hauschild | B23C 5/1081 |
| | | | | 407/56 |
| 7,052,214 B2 | * | 5/2006 | Janness | B23C 5/109 |
| | | | | 407/42 |
| 8,622,669 B2 | * | 1/2014 | Gardner | B23B 29/04 |
| | | | | 407/17 |
| 8,628,281 B2 | | 1/2014 | Azegami et al. | |
| 9,457,410 B2 | * | 10/2016 | Törnström | B23B 29/248 |
| 9,505,059 B2 | * | 11/2016 | Chen | B23B 29/046 |
| 9,616,507 B2 | | 4/2017 | Azegami et al. | |
| 9,782,841 B2 | * | 10/2017 | Pfeuffer | B23C 5/10 |
| 10,442,005 B2 | * | 10/2019 | Yang | B23C 5/205 |
| 11,351,614 B2 | * | 6/2022 | Baldwin | B23D 53/12 |
| 11,577,323 B2 | * | 2/2023 | Rabouh | B23B 31/1075 |
| 2003/0023642 A1 | | 1/2003 | Bankston | |
| 2003/0147713 A1 | | 8/2003 | Dembicks | |
| 2003/0178797 A1 | | 9/2003 | Lovichik et al. | |
| 2003/0210963 A1 | * | 11/2003 | Kakai | B23B 31/1107 |
| | | | | 408/231 |
| 2005/0117988 A1 | | 6/2005 | Stojanovski | |
| 2006/0257215 A1 | * | 11/2006 | Kakai | B23C 5/10 |
| | | | | 407/101 |
| 2010/0143051 A1 | * | 6/2010 | Lutfi | B23C 5/1018 |
| | | | | 409/234 |
| 2011/0008114 A1 | * | 1/2011 | Wang | B23B 29/24 |
| | | | | 407/113 |
| 2013/0028669 A1 | * | 1/2013 | Cigni | B23C 5/10 |
| | | | | 407/66 |
| 2017/0014917 A1 | * | 1/2017 | Chang | B23C 5/109 |

FOREIGN PATENT DOCUMENTS

| | | | | |
|---|---|---|---|---|
| JP | 11151608 A | * | 6/1999 | B23B 31/005 |
| JP | 2001087926 A | * | 4/2001 | B23C 5/109 |
| JP | 2001315014 A | * | 11/2001 | B23C 5/109 |
| WO | WO-2010057993 A1 | * | 5/2010 | B23C 5/109 |

* cited by examiner

CUTTER ASSEMBLY

CROSS REFERENCE TO RELATED APPLICATIONS

This application is a continuation in part of and claims the benefit of priority to international application No. PCT/US2023/011370, filed on Jan. 23, 2023, which claims the benefit of priority to U.S. provisional patent No. 63/420,581, filed on Oct. 29, 2022; the entirety of which each of which is hereby incorporated by reference herein.

BACKGROUND OF THE INVENTION

Field of the Invention

The invention relates to a cutter assembly that is configured to interchange a cutter bit and has a plurality of retaining features to secure the cutter bit to ensure positive retention and alignment along a rotational axis.

Background

Some cutter assemblies have interchangeable cutter bits that are bolted onto a hub. The cutter bits however are often misaligned and are not retained effectively for cutting precision parts.

SUMMARY OF THE INVENTION

The invention is directed to a cutter assembly that is configured to interchange a cutter bit and has a plurality of retaining features to secure the cutter bit to ensure positive retention and alignment along a rotational axis. An exemplary cutter assembly has a cutter bit retained within a slot of the retainer component and the retainer component coupled to a chuck component. The chuck component is configured to be coupled with a rotary power tool, such as to the chuck of the rotary power tool. The retainer component may be detachably attachable to the chuck component and may have an engagement portion with external threads that are configured to thread into the internal threads of the chuck component. The cutter bit may be retained in the slot by a threaded retainer that extends through a retainer aperture in a first side of the retainer component, through a cutter aperture in the cutter bit, through the slot and into a threaded retainer aperture in the opposing or second side of the retainer component. The threaded retainer is configured to extend orthogonally to the slot to pull the first side of the retainer component to the second side and pinch or compress against the cutter bit therein. The retainer aperture in the first side of the retainer component may be countersunk to center or seat the head of the threaded retainer therein. The threaded retainer, such as a bolt, may position and retain the cutter bit centrally with respect to a rotational axis. The cutter bit may also be retained by seating surfaces in the retainer component that engage with seating edges of the cutter bit, along the extended end of the slot or retainer component. The cutter bit may also be retained by seating surfaces of the chuck component that engage with seating surfaces of the cutter bit. The chuck component may have seating surfaces along the inside and/or outside of the chuck opening. A seating surface may extend at an offset angle from the rotational axis to enable sliding along the rotational axis for centering one part with another, or seating along the rotational axis. These plurality of retainment features for the cutter bit ensures that the cutter bit is positively retained in a fixed position and aligned along the rotational axis which may be aligned centrally along the rotational axis of the cutter assembly for cutting uniformity from first cutting edge to the second cutting edge.

A cutter bit may be for flush cutting or may have a contoured cutting surface or cutting edge. A flush cutter type cutter bit may have a first cutting edge that extends parallel with a second cutting edge and a bearing may be coupled to the extended end of the retainer component. The bearing may be cylindrical in shape and spin along an object to be cut and may have a diameter of at least 15 mm or more, or at least 30 mm or more. A cutter bit may have an internal or external radius cutting edge that has a radius of about 1.87 mm (0.0625 in) to 6.35 mm (0.25 in), for example. A cutter bit may have any other contoured surface such cutter bits configured for milling or routing a contour in a material, such as wood, plastic or metal. A cutter bit may have flanges that extend down past the extended end of the retainer component. The seating edge of the cutter bit may be tapered toward the retainer end and configured to extend into the chuck opening of the chuck component. The seating edges of the cutter bit may flare outward from the retainer end of the cutter bit and engage with a tapered surface on the outside of the cutter opening or engagement portion of the chuck component. The seating edge on the extended end of the cutter bit may flare outward or taper inward and engage with a seating surface on the retainer end of the retainer component. A cutter bit may by symmetric about a rotational axis of the cutter bit, having the cutting edges extending in the same rotational direction.

A retainer component may have a slot that extends in from the engagement end of the retainer component, or the extended end of the retainer component. A slot extending in from the engagement end of the retainer component requires that the retainer component be detachably attachable to the chuck component. The slot may extend a length that is about 10 mm or more, about 20 mm or more, about 40 mm or more and any range between and including the slot lengths provided. The slot length may be greater than the cutter bit length, or is at least a substantial portion of the cutter bit length, such as about 50% of the cutter bit length or more, or about 75% or more of the cutter bit length or more, about 85% of the cutter bit length or more, or even 90% of the cutter bit length. This large amount of contact and retainment of the cutter bit in the slot may ensure proper alignment to secure the cutter bit in the retainer component. In this case, the retainer component may have external threads on the engagement portion configured to thread into the internal threads of the chuck component. A retainer component, with a slot extending in from the retainer end, may be a monolithic part with the chuck component and the cutter bit may be retained by the threaded retainer and seating surfaces in the retainer component and/or chuck component.

The cutter assembly allows for quick and easy replacement of a cutter bit and provides multiple surfaces for engaging with the cutter bit to retain it in a fixed position. The cutter assembly is versatile and allows for the use of a wide range of cutter bits.

The phrase "align the cutter bit along the rotational axis" means that the cutter bit is centrally aligned along the rotational axis of the cutter assembly, wherein the first cutting edge is substantially the same distance from the rotational axis of the cutter assembly as the second cutting edge of the cutter bit, or within about 10% or less, and preferably with 5% or less, or even 2% or less.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
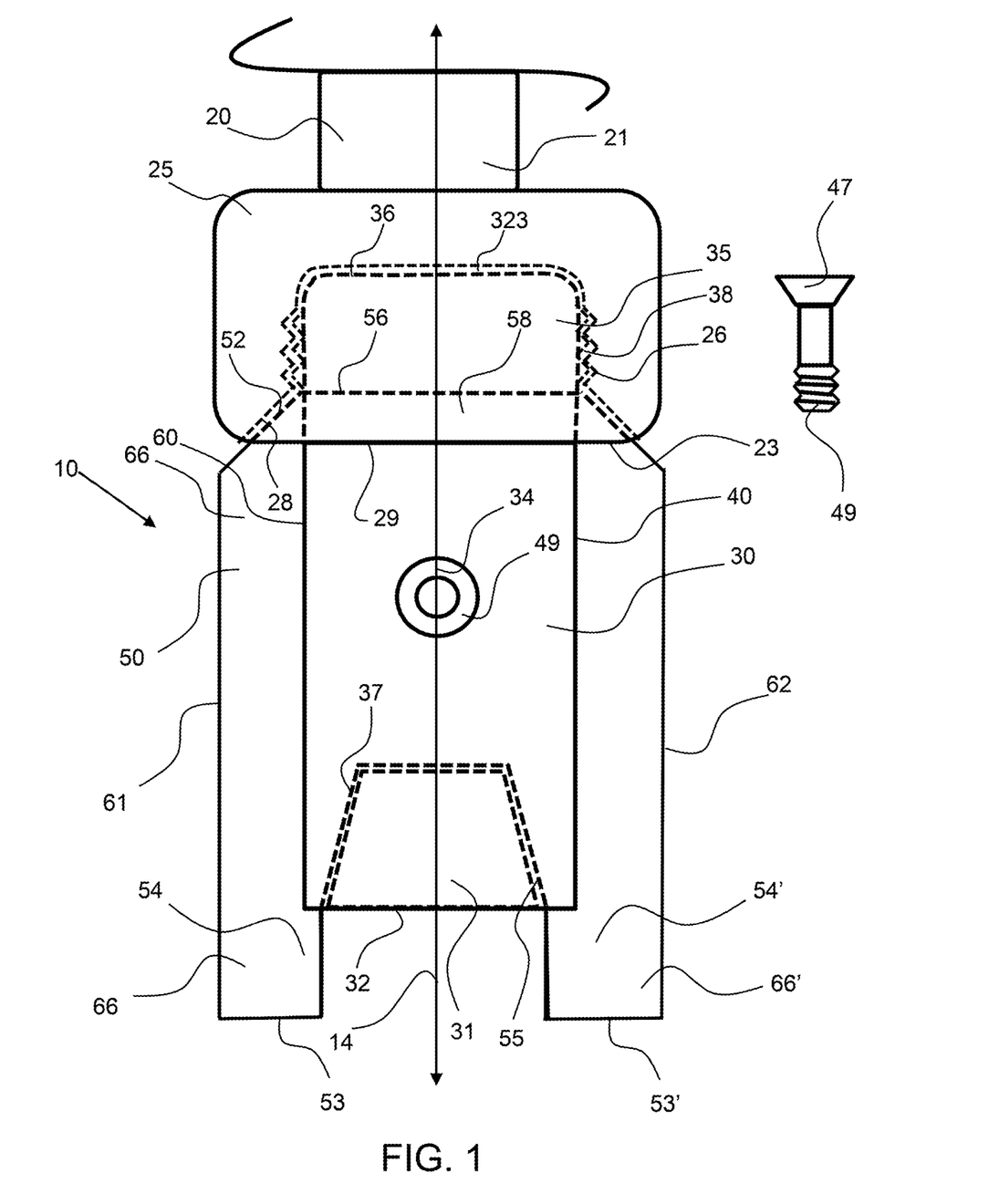
FIG. 1 shows a perspective view of an exemplary cutter assembly having the cutter bit retained within the slot of the retainer component and the chuck component threaded onto the retainer component to retain the cutter bit in the slot of the retainer component.

As shown in FIG. 1, an exemplary cutter assembly 10 has a cutter bit 50 retained within the slot 40 of the retainer component 30 and the retainer component threaded into the chuck component 20. The first cutting edge 61 and the second cutting edge 62 of the cutter bit 50 are extend out laterally or radially from the rotational axis 14 of the cutter assembly 10 and are exposed for cutting. As described herein, the cutter bit may be centrally aligned along the rotational axis of the cutter assembly, wherein the first cutting edge 61 is substantially the same distance from the rotational axis as the second cutting edge 62. The cutter bit has cutter flanges 54, 54' that extend down past extended end 32 of the retainer component 30 to extended ends 53, 53' of the cutter bit 50. The cutter bit 50 is retained by a threaded retainer 49, such as a bolt 47, that extends through the retainer aperture 34 in a first side of the retainer component 30, through an aperture in the cutter bit and through the slot 40 and threads into a second side of the retainer component, across the slot 40 of the retainer component. The cutter bit 50 has extended portions 66, 66' that extend out radially from the retainer component 30 to a first cutting edge 61 and second cutting edge 62. Also, the cutter bit 50 is retained in the slot 40 and centered along the rotational axis 14 of the cutter assembly by the retainer seat 31 configured on the extended end 32 of the retainer component and having seating surfaces 37 that seat with corresponding seating edges 55 of the cutter bit 50. Likewise, the cutter bit is retained and centered along the rotational axis 14 by seating edges 52 that interface with a seating surface 28 of the chuck component 20. As shown, the seating surface of the chuck component 20 is an interior seating surface that tapers along the chuck opening 29 on the engagement end 23 into the opening or toward the chuck end of the chuck component. The cutter bit therefore has multiple edges and surfaces including the cutter bit being retained in the slot 40 by the threaded retainer, the seating edges along the extended end and the seating edges along the retainer end 56 of the cutter bit.

The engagement portion 25 of the chuck component 20 is threaded onto the external threads 38, or male threads of the engagement portion 35 of the retainer component 30 by the internal threads 26, or female threads of the chuck component 20. The retainer component 30 has a slot opening 36 on the engagement end 323 of the retainer component. The chuck component 20 has the engagement portion 25 configured to detachably attach the retainer component 30 and a chuck portion 21 is configured to engage with a rotary power tool, such as a mill, lathe, drill and the like.

Figure 2:
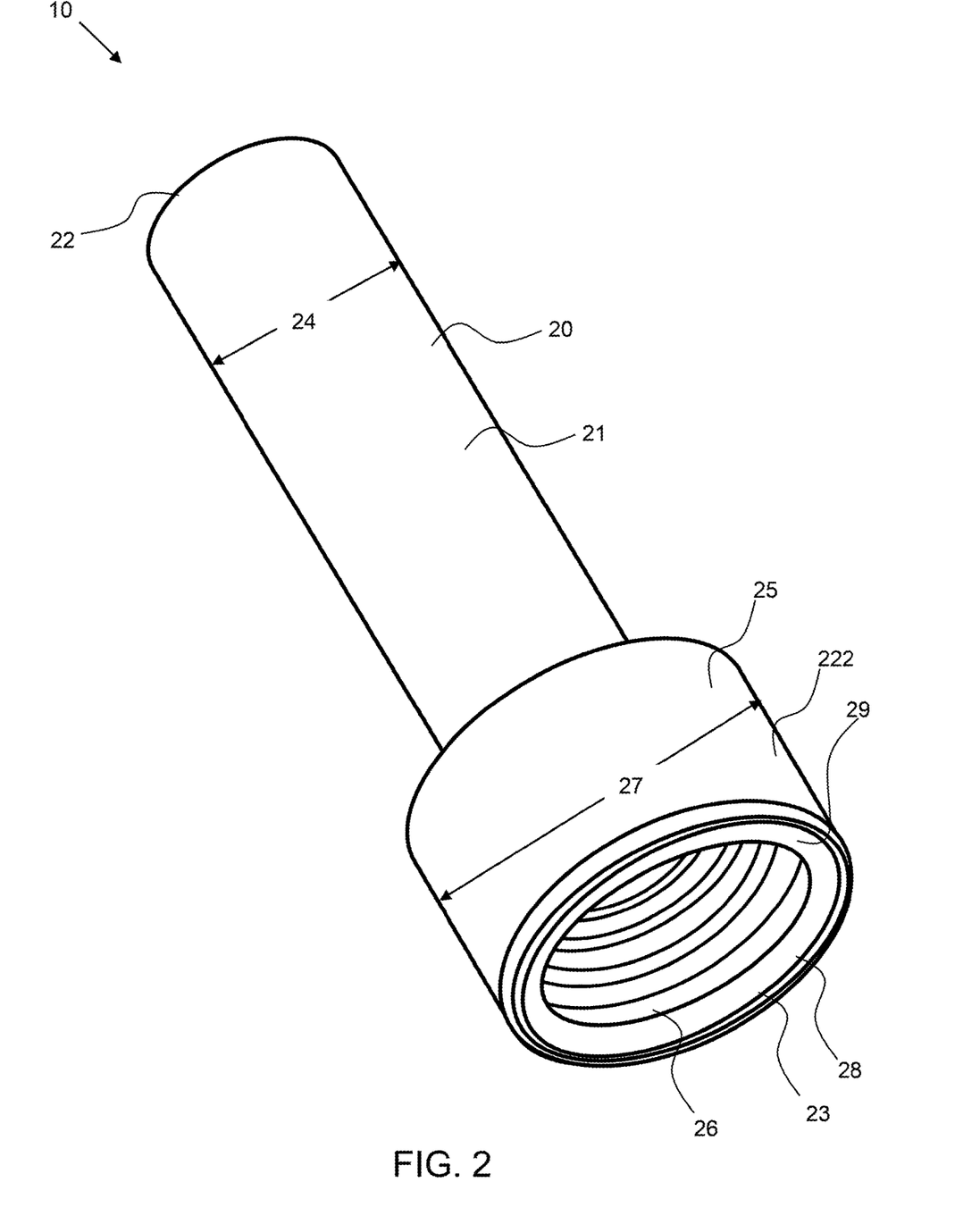
FIG. 2 shows a perspective view of a chuck component having a chuck portion for engagement with a tool and an engagement portion having internal threads for engagement with the external threads of a retainer component.

As shown in FIG. 2, an exemplary chuck component 20 of the cutter assembly 10 has a chuck portion 21 for engagement with a rotary power tool and an engagement portion 25 having internal threads 26 for engagement with the external threads of a retainer component. The chuck component has a length from a chuck end 22 to the engagement end 23. The width or diameter 27 of the engagement portion 25 may be greater than the diameter 24 or width of the chuck portion 21, as shown. The engagement portion 25 of the chuck component 20 has a chuck opening 29 that may be chamfered on the internal surface and/or an external surface to create a seating surface 28 for seating with a corresponding edge of the cutter bit. As shown, the chuck opening 29 has a chamfered surface forming a seating surface 28 that tapers toward the chuck end 22 of the chuck component. Also, the outside surface 222 of the engagement end 23 of the engagement portion 25, is tapered toward the engagement end 23, forming a seating surface 29' on the outside surface.

Figure 3:
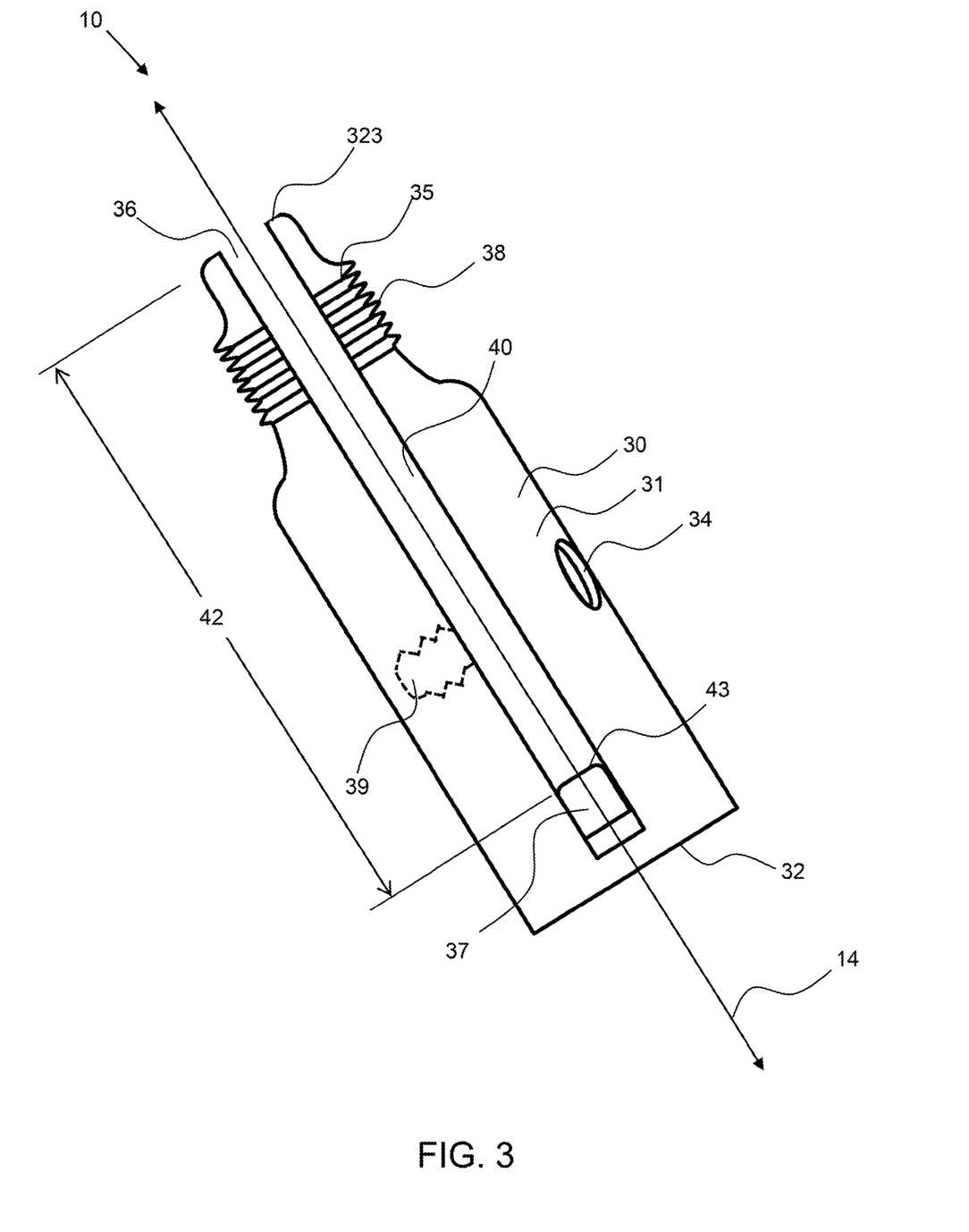
FIG. 3 shows a perspective view of a retainer component having a slot extending from an engagement end toward an extended end of the retainer component to a slot end.
Figure 4:
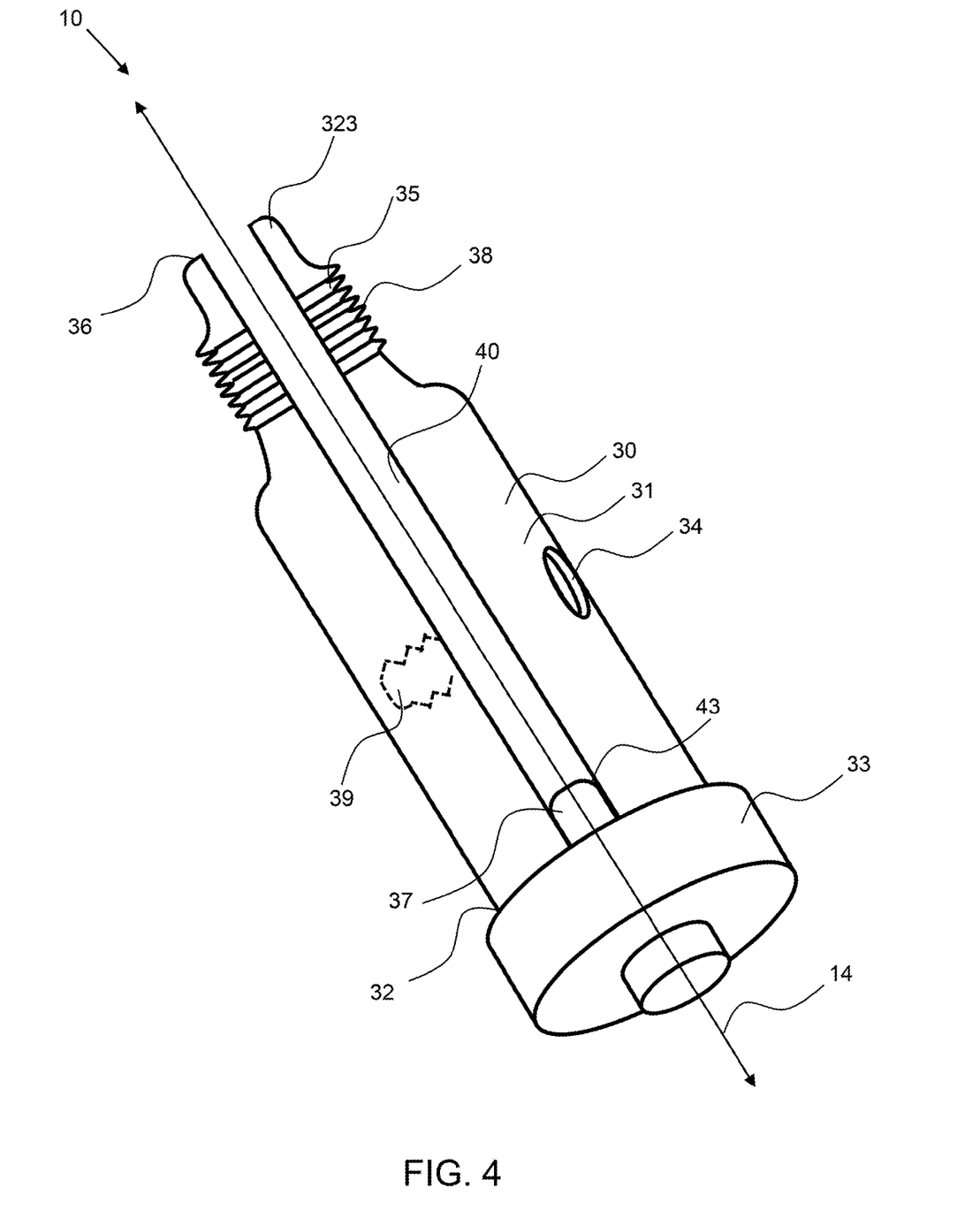
FIG. 4 shows a perspective view of a retainer component having a slot extending from an open end toward a bearing end of the retainer component to a slot end.

Referring now to FIGS. 3 and 4, a retainer component 30 of the cutter assembly 10 has a slot 40 extending from a slot opening 36 on the engagement end 323 toward an extended end 32 of the retainer component 30 to a slot end 43. The slot 40 is configured to receive the cutter bit therein and has a slot length 42 from the slot opening 36 to the slot end 43. The slot extends across the entire retainer component from a first side of the retainer component to a second side of the retainer component, opposite said first side, producing openings on opposing sides of the retainer component 30 for the cutter bit to extend therefrom. Put another way, the slot may be planar wherein the first side of the retainer slot is configured 180 degrees about the retainer component from the second side of the retainer slot. The slot end 43 of the slot 40 may have seating surfaces 37 for positively locating and retaining the cutter bit. This configuration will retain the cutter bit laterally within the cutter slot. The slot extends along the rotational axis 14, the axis around which the cutter assembly 10 including the chuck component 20, the retainer component 30, and cutter bit 50 rotate. The engagement portion 35 may be tapered in dimension toward the engagement end 323 and have external threads 38 for engagement with the internal threads of the chuck component shown in FIG. 2. The threaded engagement may compress the slot and pinch a cutter bit configured within the slot. The retainer component may have a retainer aperture 34 in a first side of the retainer component, that may be a countersunk retainer aperture, as shown, to positively position a threaded retainer head therein and a threaded retainer aperture 39 with threads to allow a threaded retainer to thread therein for detachable attachment of a cutter bit. As shown in FIG. 4, a bearing 33 is coupled to the extended end 32 of the retainer component 30.

Figure 5:
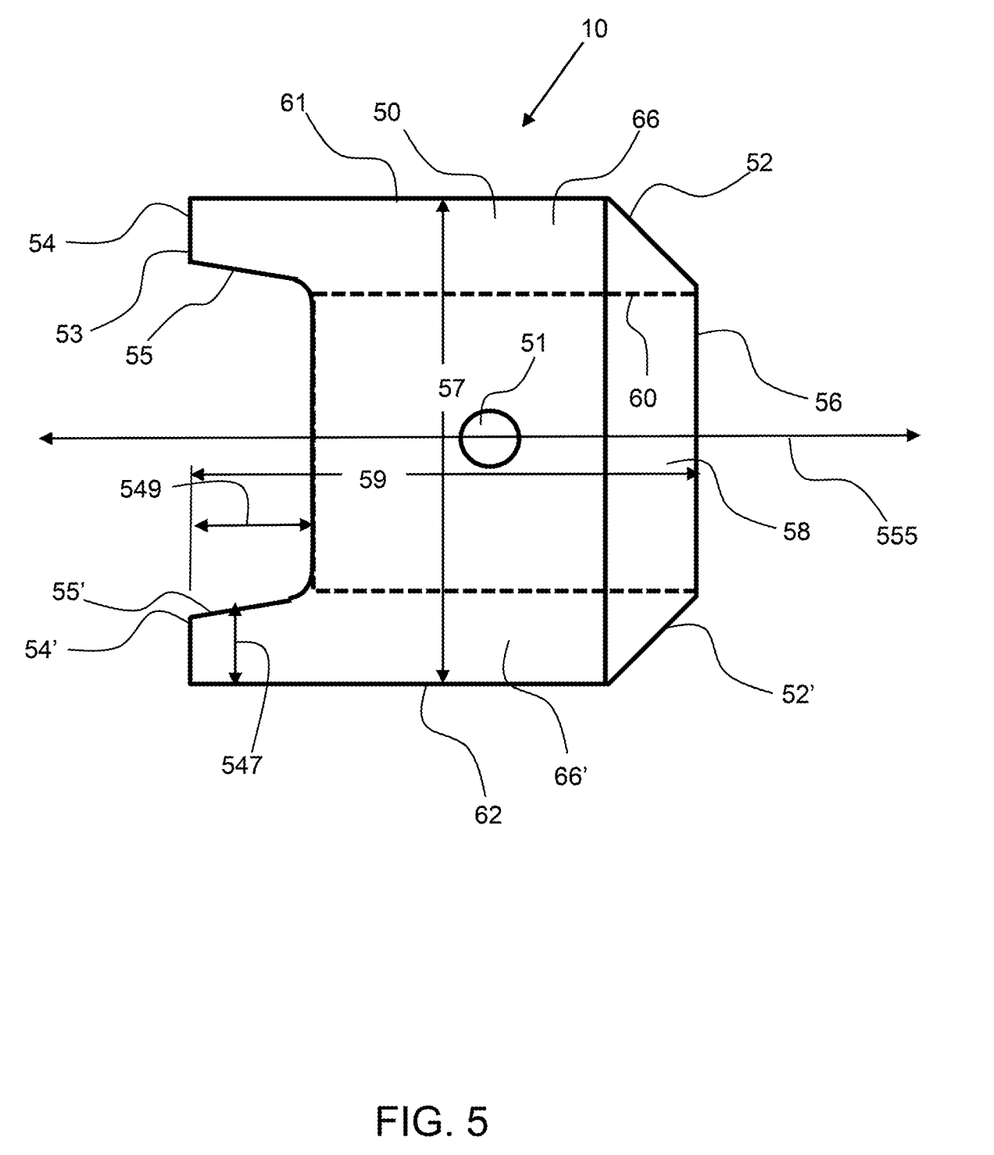
FIG. 5 shows a front face view of an exemplary cutter bit having a tapered retainer end and a flange end with two flanges extending from either side of the cutter bit and wherein the cutter bit is symmetric about the rotational axis of the cutter bit.

As shown in FIG. 5, an exemplary cutter bit 50 of the cutter assembly 10 has a retainer end 56 with seating edges 52, 52' in the seating portion 58, or portion that is configured to extend into the chuck component. The cutter bit 50 has an extended end 53 with two cutter flanges 54, 54' extending down from along either side of the cutter bit. The flanges have a length 549 and a width 547. The cutter bit has a length 59 from the flange end 53 to the retainer end 56 a width 57 from the first cutting edge 61 to the second cutting edge 62, and a thickness from the first side 51 to the second side 52. The cutter bit, or at least the slot portion of the cutter bit, may be planar in shape and this planar shape may allow the cutter bit to easily side into the slot of the retainer component wherein a first extended portion 66 extends out a first side of the retainer slot to the first cutting edge 61 and the second first extended portion 66' extends out a second side, opposite the first side, of the retainer slot to the second cutting edge 62. The cutter bit may be planar extending in a plane from the first cutting edge to the second cutting edge. Seating edges 55, 55' are configured on the extended end and configured to seat with the retainer component seating surfaces. The cutter bit has a seating portion 58 that tapers in width from toward the retainer end 56 of the cutter bit. The cutter bit has a first cutting edge 61 on the first side and a second cutting edge 62 on the second side of the cutter bit 50. A slot portion 60 of the cutter bit 50 is the portion that is configured in the slot of the retainer component and the extended portions 66, 66' extend out from the slot, radially with respect to the rotational axis 555 of the cutter bit and cutter assembly. As shown, the cutter bit 50 may be symmetric about the rotational axis 555 of the cutter bit, having the cutting edges extending out the same distance from the same rotational axis.

Figure 6:
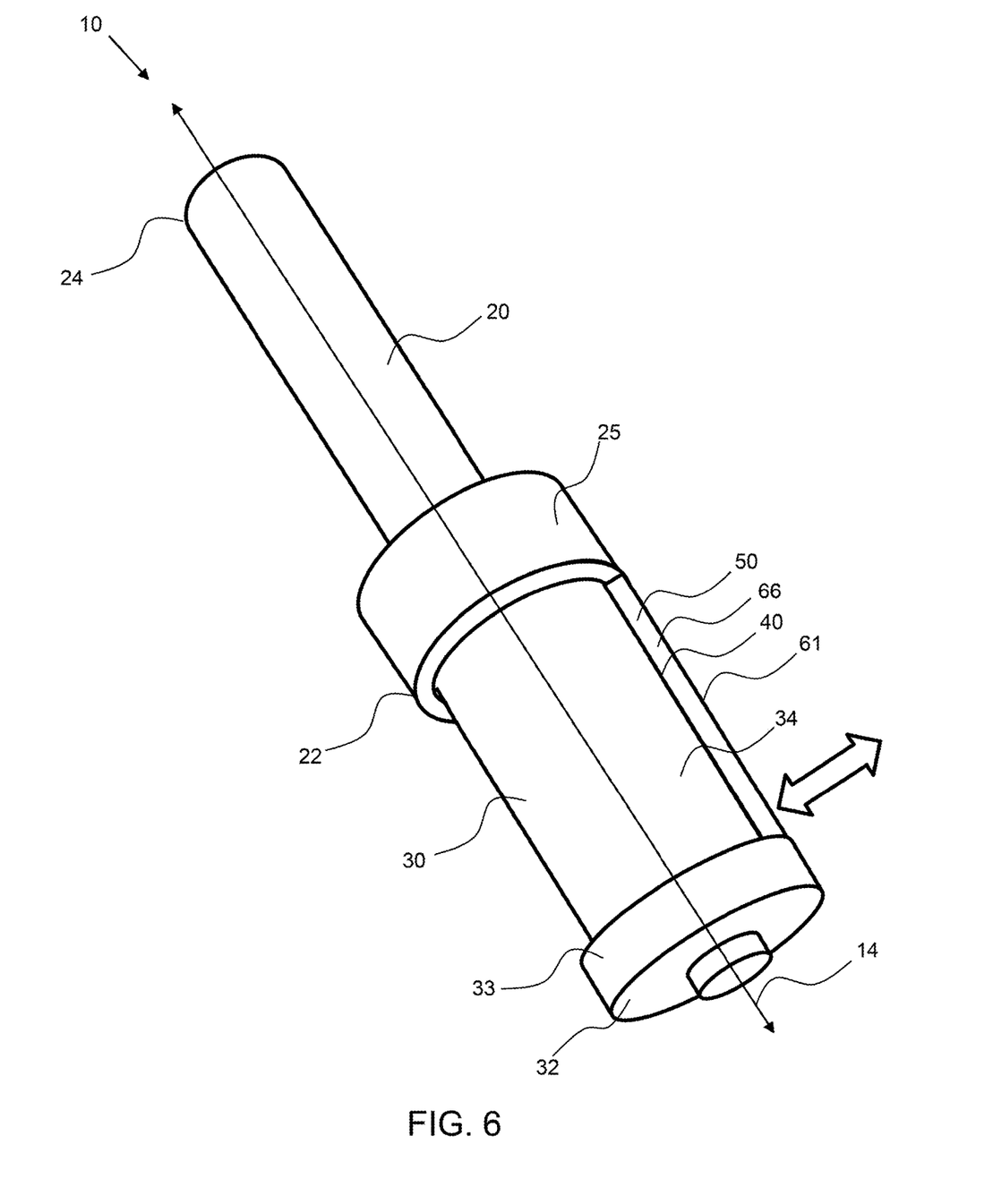
FIG. 6 shows a perspective view of an exemplary cutter assembly having a bearing and configured for flush cutting.

As shown in FIG. 6, an exemplary cutter assembly 10 has the cutter bit 50 configured in the slot 40 of the retainer component 30. The retainer component 30 is coupled to the chuck component 20 and a bearing 33 is configured on the extended end 32 of the retainer component. The extended portion 66 of the cutter bit 50 extends to a first cutting edge 61 that is aligned with the outer surface of the bearing.

Figure 7:
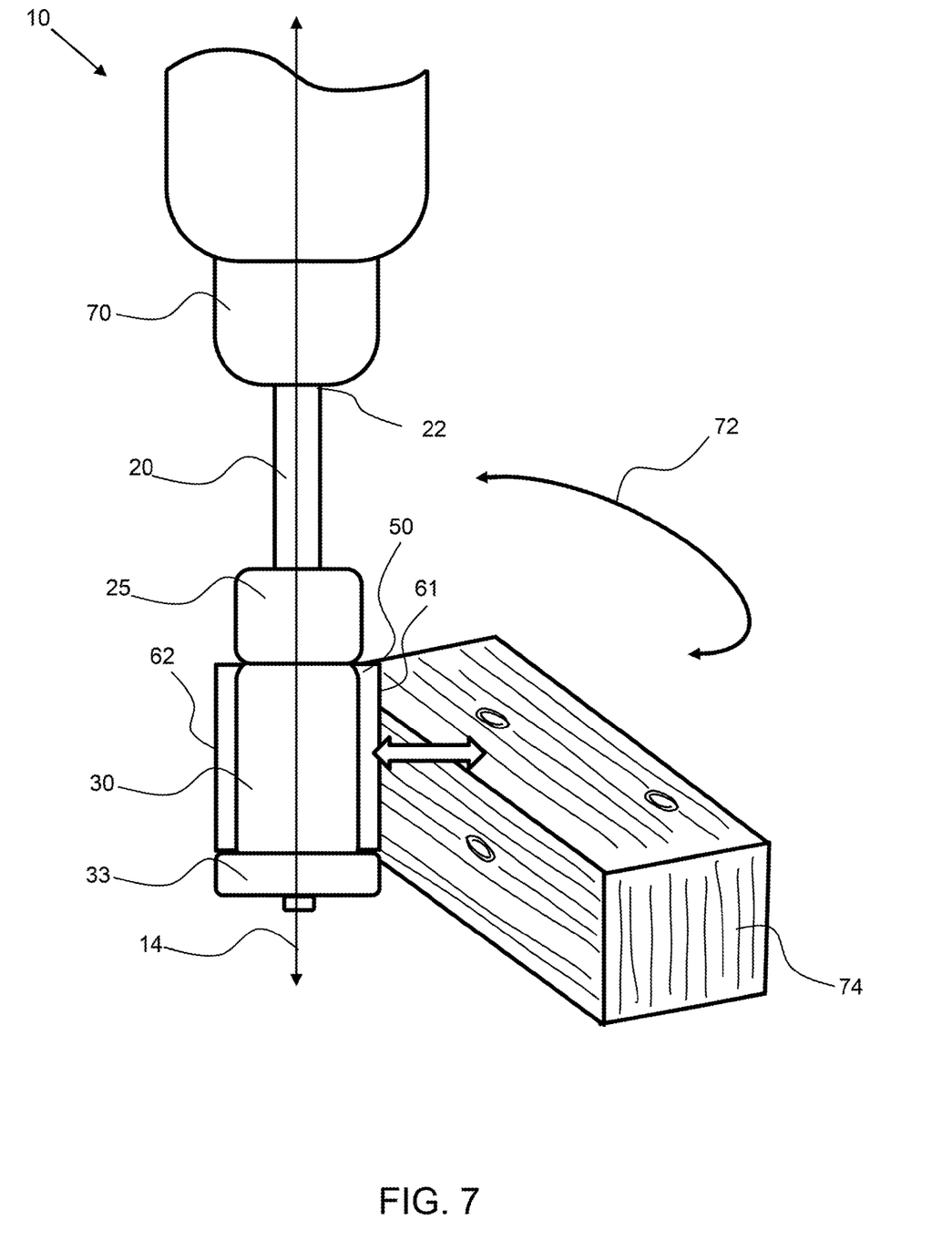
FIG. 7 shows a perspective view of an exemplary cutter assembly coupled with a tool and flush cutting a piece of lumber, wherein the cutter bit cuts the wood according to a template.

As shown in FIG. 7, an exemplary cutter assembly 10 is coupled with a rotary power tool 70 and is configured for routing a piece of lumber or cutting material 74, wherein the cutter bit 50 cuts the wood along a desired or computed path 72.

Figure 8:
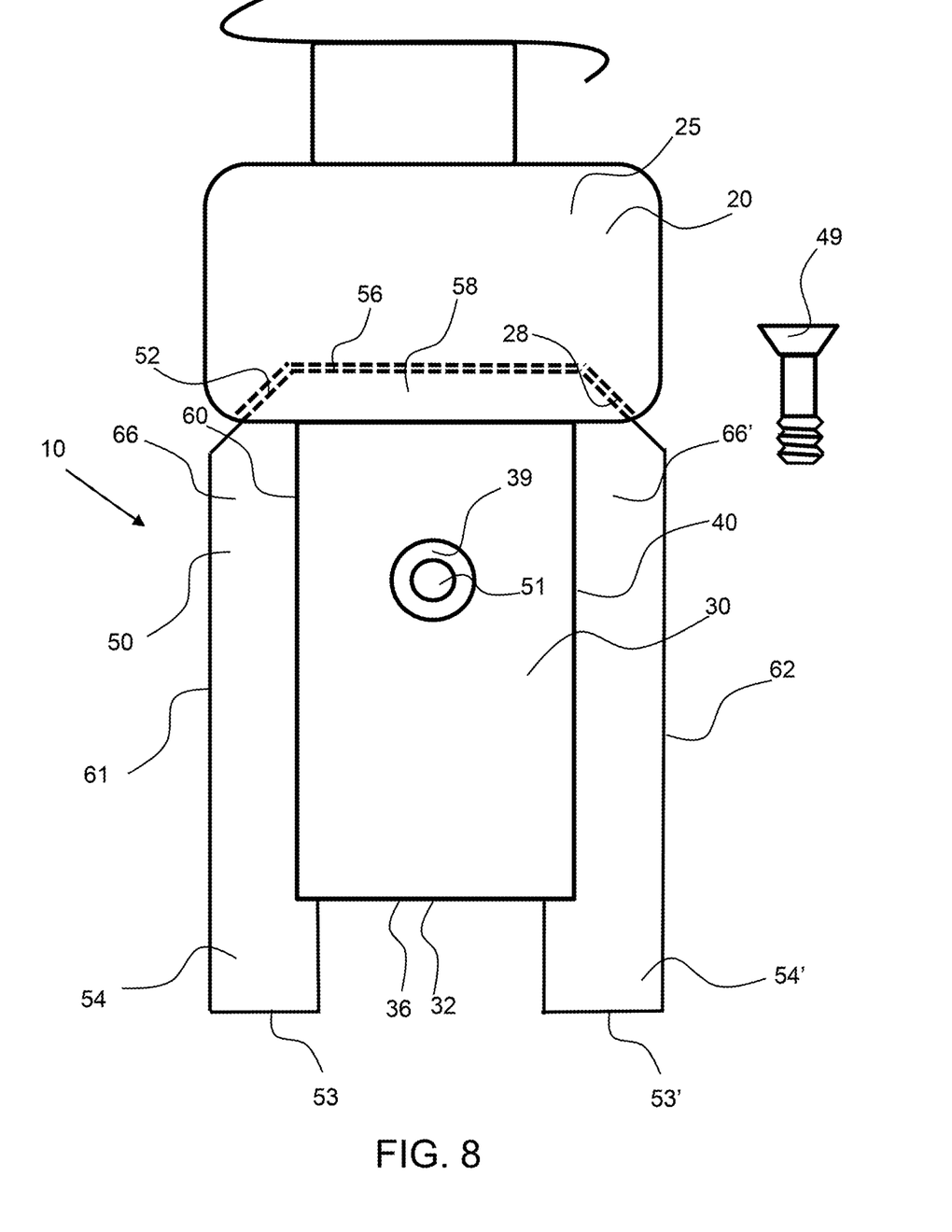
FIG. 8 shows a side view of an exemplary cutter assembly having cutter bit that is configured to be retained within a retainer component by a threaded retainer and by a seating surface that includes a tapered geometry to the retainer end interfacing with a corresponding seating surface of the engagement portion of the chuck component having an internal tapered surface of the chuck component, tapering toward the chuck portion of the chuck component.

As shown in FIG. 8, an exemplary cutter assembly 10 has the cutter bit 50 configured in the slot 40 of the retainer component 30. The retainer component 30 is coupled to the chuck component 20 with the seating portion 58 of the cutter bit 50 extending into the engagement portion 25 of the chuck component 20. The slot opening 36 is configured on the extended end 32 of the retainer component. The cutter bit slides up through the slot 40 and is positively located by the seating edges 58 seating with the seating surfaces of the chuck component and by the threaded retainer 49 configured to extend through the threaded retainer aperture 39. In this embodiment, the chuck component 20 may be attached to the retainer component 30 wherein these two components are a monolithic component.

Figure 9:
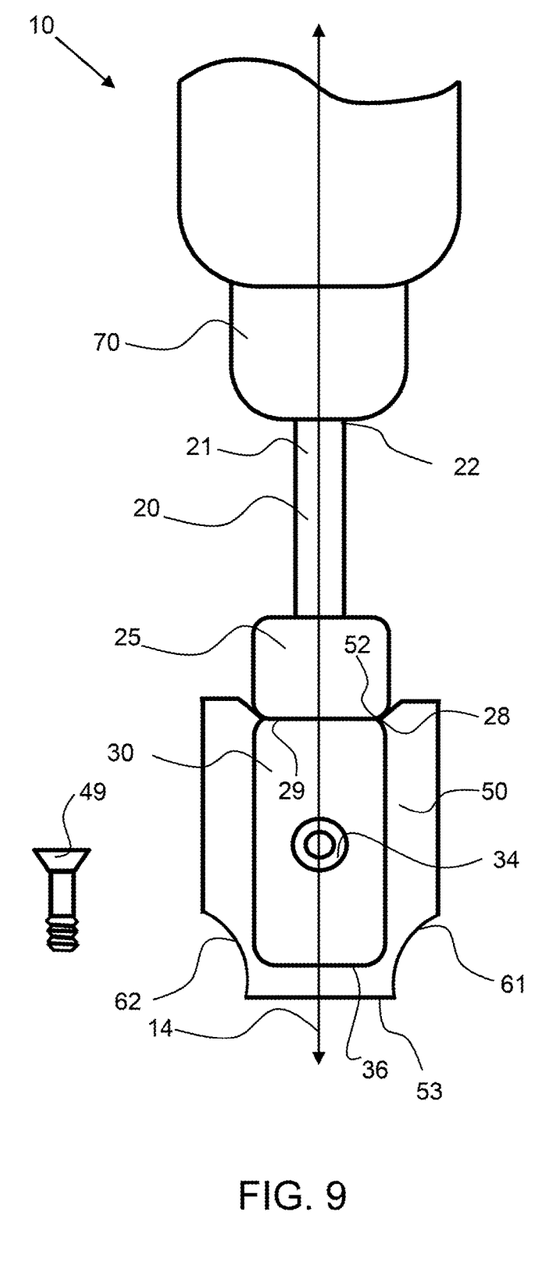
FIG. 9 shows a side view of an exemplary cutter assembly having the cutter bit that is retained within a retainer component by a threaded retainer and by the seating surfaces of the retainer end interfacing with a corresponding external seating surface of the chuck component, wherein the cutter assembly is coupled with a chuck of a rotary power tool.
Figure 10:
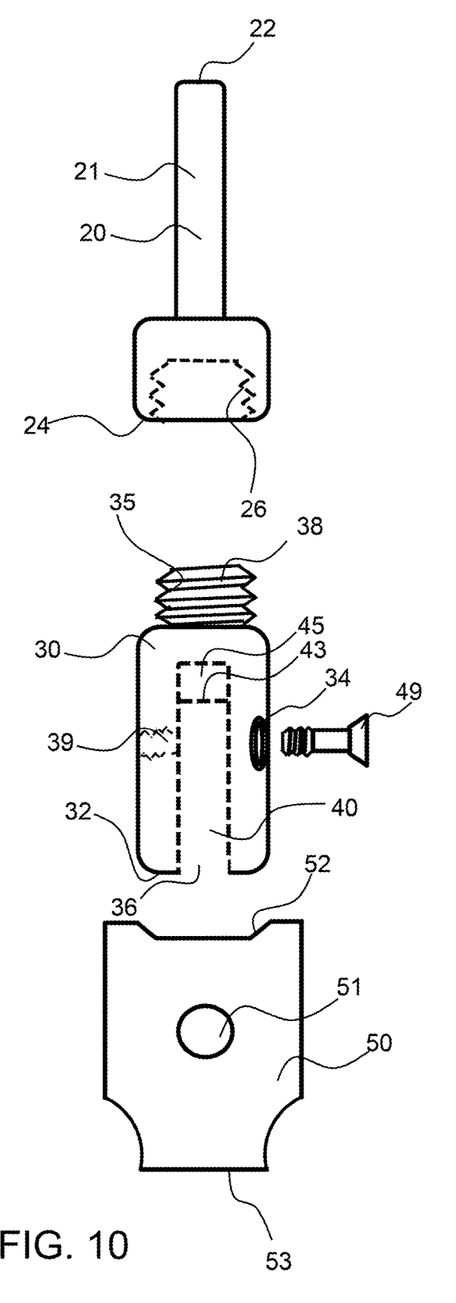
FIG. 10 shows the components of the assembly shown in FIG. 9.

Referring now to FIGS. 9 and 10, an exemplary cutter assembly 10 has the cutter bit 50 configured in the slot 40 of the retainer component 30. The retainer component 30 is coupled to the chuck component 20 with the seating edge 52 of the cutter bit 50 extending along the seating surface 28 of chuck component 20. In this embodiment, the seating surface 28 of the chuck component is along an outside surface of the chuck opening 29 and corresponds with the seating edge 52 of the cutter bit, as best shown in FIG. 10. The cutter bit has an inside radius first cutting edge 61 and second cutting edge 62. The slot opening 36 is configured on the extended end 32 of the retainer component and has engagement surfaces 45, a type of seating surface, on the slot end 43. The cutter bit slides up through the slot 40 and is positively located by the seating edges 52 seating with the seating surfaces of the chuck component and by the threaded retainer 49 that extends through the threaded retainer aperture 39. In this embodiment, the chuck component 20 may be attached to the retainer component 30 wherein these two components are a monolithic component. As shown in FIG. 10, the retainer component 30 may be configured with external threads 38 for threading into the internal threads 26 of the chuck component 20. Also shown, the retainer component 30 has a retainer aperture 34 in a first side of the retainer component and a threaded retainer aperture 39 in the opposing second side of the retainer component, across the slot 40. The axis of threaded retainer through the aligned apertures is orthogonal to the plane of the slot, or within 5 degrees or less of orthogonal.

Figure 11:
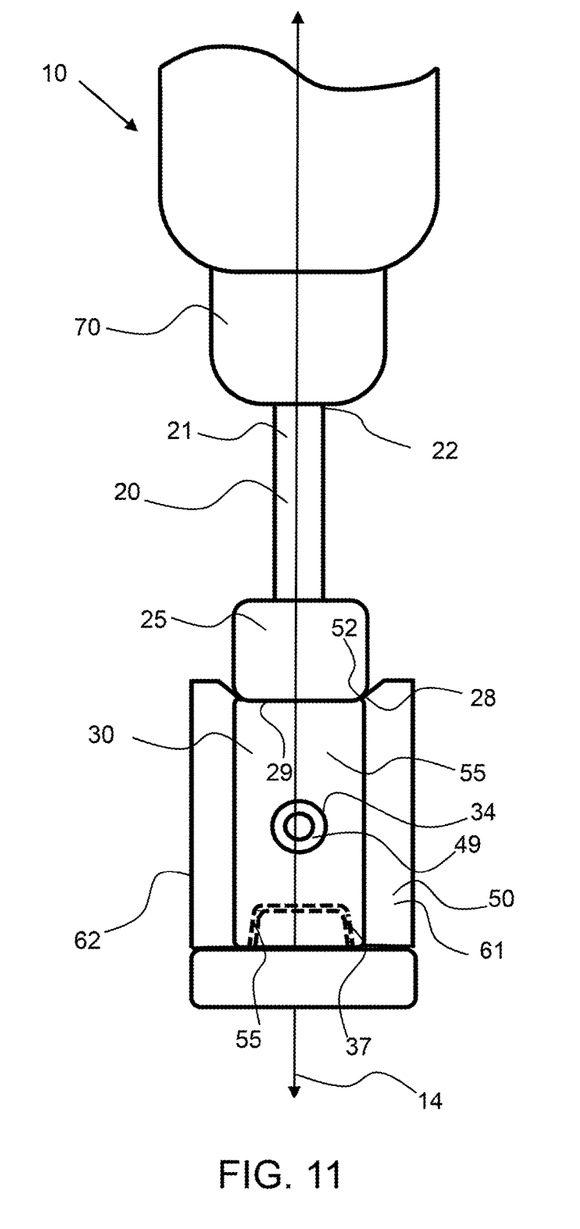
FIG. 11 shows a side view of an exemplary cutter assembly having the cutter bit retained within a slot of the retainer component by a threaded retainer and by the seating surfaces of the retainer end interfacing with a corresponding external seating surface of the chuck component.
Figure 12:
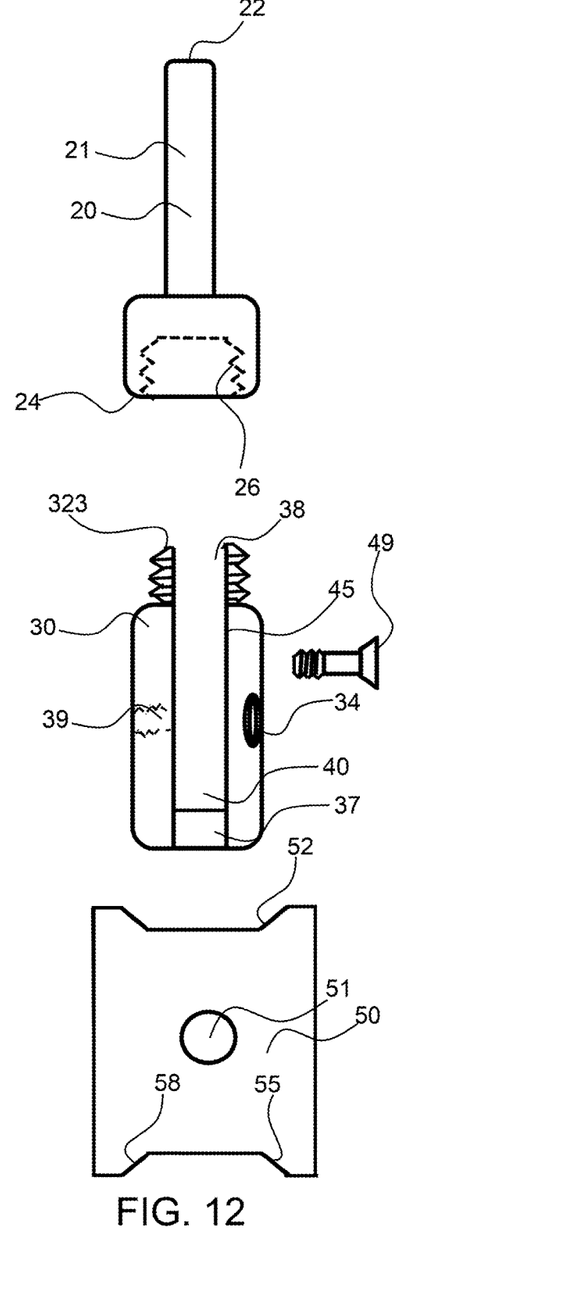
FIG. 12 shows the components of the assembly shown in FIG. 11.

Referring now to FIGS. 11 and 12, an exemplary cutter assembly 10 has the cutter bit 50 configured in the slot 40 of the retainer component 30. The retainer component 30 is coupled to the chuck component 20 with the seating edge 52 of the cutter bit 50 extending along the seating surface 28 of chuck component 20. In this embodiment, the seating surface 28 of the chuck component is along an outside surface of the chuck opening 29 and corresponds with the seating edge 52 of the cutter bit, as best shown in FIG. 12. The cutter bit 50 has straight and parallel cutting edges with the first cutting edge 61 extending parallel with the second cutting edges 62. This is a flush cutter and these edges are aligned with the exterior surface of the bearing. The slot opening 36 is configured on the engagement end 323 of the retainer component 30. The cutter bit slides down through the slot 40 and is positively located by the seating edges 55 seating with the seating surfaces 37 of the retainer component 30 and by the threaded retainer 49 that extends through the retainer aperture 34, the cutter aperture 51, slot 40 and into the threaded retainer aperture 39. When the retainer component is threaded into the chuck component 20, the seating edges 52 of the cutter bit engage with the seating surfaces of the chuck component. As shown in FIG. 12, the retainer component 30 is configured with external threads 38 for threading into the internal threads 26 of the chuck component 20.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A cutter assembly comprising:
   a) a chuck component comprising:
      i) a chuck portion configured to be retained by a rotary power tool; and
      ii) an engagement portion;
   b) a cutter bit comprising:
      i) a first cutting edge and a second cutting edge opposite the first cutting edge;
      ii) a cutter aperture;
      iii) a length from a retainer end to an extended end, wherein the retainer end is more proximal to said chuck component than the extended end;
      iv) a pair of seating edges that extend at an offset angle to a rotational axis of the cutter assembly;
   c) a retainer component coupled with the engagement portion of the chuck component and comprising:
      i) a slot having a slot opening and extending to a slot end;
      wherein the cutter bit is configured within said slot through said slot opening;
      ii) a retainer aperture in a first side of the retainer component;
      iii) a threaded retainer aperture in a second side of the retainer component, opposite the first side and across the slot from said first side;
   d) a threaded retainer extending through the retainer aperture, the cutter aperture and the threaded retainer aperture to retain the cutter bit between in the slot of the retainer component, wherein the threaded retainer is detachably attachable to the retainer component to enable the cutter bit to be detachably attached to the retainer component;
   wherein the chuck component has a seating surface along the engagement portion of the chuck component that is aligned with the pair of seating edges of the cutter bit to align the cutter bit along the rotational axis
   wherein the pair of seating edges of the cutter bit forms a seating portion of the cutter bit that tapers toward the retainer end of the cutter bit; and
   wherein the engagement portion of the chuck component forms a chuck opening and wherein the seating surface of the chuck component extends along the said chuck opening, and wherein the pair of seating edges are configured within the chuck opening of the chuck component.

2. The cutter assembly of claim 1, wherein the retainer component further comprises external threads on an engagement end and wherein the chuck component comprises internal threads in the engagement portion to receive the external threads of the retainer component to detachably attach the retainer component to the chuck component.

3. The cutter assembly of claim 1, wherein the pair of seating edges of the cutter bit flare outward toward the retainer end of the cutter bit and wherein the seating surface of the chuck component is configured along an outside surface of the engagement portion of the chuck component.

4. The cutter assembly of claim 3, wherein the retainer component further comprises external threads on an engagement end and wherein the chuck component comprises internal threads in the engagement portion to receive the external threads of the retainer component to detachably attach the retainer component to the chuck component.

5. The cutter assembly of claim 1, wherein the retainer component has a pair of seating surfaces on the slot end of the slot that are aligned with the pair of seating edges of the cutter bit to align the cutter bit along the rotational axis;
   The slot opening 36 is configured on the extended end 32 of the retainer component and has engagement surfaces 45, a type of seating surface, on the slot end 43.

6. The cutter assembly of claim 5, wherein the slot opening of the retainer component is on an engagement end of the retainer component and wherein the pair of seating edges of the cutter bit are on the extended end of the cutter bit and taper outward toward the retainer end of the cutter bit.

7. The cutter assembly of claim 6, wherein the cutter bit has a pair of flanges that extend down past the extended end of the retainer component.

8. The cutter assembly of claim 5, wherein the cutter bit has a pair of flanges that extend down past the extended end of the retainer component.

9. He cutter assembly of claim 5, wherein the slot in the retainer component extends into the retainer component from the extended end of the retainer component.

10. The cutter assembly of claim 9, wherein the pair of seating edges of the cutter bit are on the retainer end of the cutter bit and taper outward toward the retainer end of the cutter bit.

11. The cutter assembly of claim 1, wherein the cutter bit has a slot portion that is configured in the slot of the retainer component and wherein said slot portion of the cutter bit is planar.

12. The cutter assembly of claim 1, wherein the cutter bit is planar extending in a plane from the first cutting edge to the second cutting edge.

13. The cutter assembly of claim 1, wherein the first cutting edge and second cutting edge comprise a radius.

14. The cutter assembly of claim 13, wherein the radius is between 1.87 mm to 6.35 mm.

15. The cutter assembly of claim 1, wherein the first cutting edge and second cutting edge comprise a contoured cutting edge.

16. The cutter assembly of claim 1, wherein the cutter bit is made of carbide.

17. The cutter assembly of claim 1, wherein the chuck component and retainer component are made of steel.

18. The cutter assembly of claim 1, wherein the chuck component and retainer component are made of a tool steel.

19. The cutter assembly of claim 1, wherein the slot has a length of at least 20 mm.

20. The cutter assembly of claim 1, wherein the slot has a length of at least 40 mm.

21. A cutter assembly comprising:
 a) a chuck component comprising:
  i) a chuck portion configured to be retained by a rotary power tool; and
  ii) an engagement portion;
 b) a cutter bit comprising:
  i) a first cutting edge and a second cutting edge opposite the first cutting edge;
  ii) a cutter aperture;
  iii) a length from a retainer end to an extended end, wherein the retainer end is more proximal to said chuck component than the extended end;
  iv) a pair of seating edges that extend at an offset angle to a rotational axis of the cutter assembly;
 c) a retainer component coupled with the engagement portion of the chuck component and comprising:
  i) a slot having a slot opening and extending to a slot end;
  wherein the cutter bit is configured within said slot through said slot opening;
  ii) a retainer aperture in a first side of the retainer component;
  iii) a threaded retainer aperture in a second side of the retainer component, opposite the first side and across the slot from said first side;
 d) a threaded retainer extending through the retainer aperture, the cutter aperture and the threaded retainer aperture to retain the cutter bit between in the slot of the retainer component, wherein the threaded retainer is detachably attachable to the retainer component to enable the cutter bit to be detachably attached to the retainer component;
wherein the first cutting edge and second cutting edge are parallel.

22. A cutter assembly comprising:
 a) a chuck component comprising:
  i) a chuck portion configured to be retained by a rotary power tool; and
  ii) an engagement portion;
 b) a cutter bit comprising:
  i) a first cutting edge and a second cutting edge opposite the first cutting edge;
  ii) a cutter aperture;
  iii) a length from a retainer end to an extended end, wherein the retainer end is more proximal to said chuck component than the extended end;
  iv) a pair of seating edges that extend at an offset angle to a rotational axis of the cutter assembly;
 c) a retainer component coupled with the engagement portion of the chuck component and comprising:
  i) a slot having a slot opening and extending to a slot end;
  wherein the cutter bit is configured within said slot through said slot opening;
  ii) a retainer aperture in a first side of the retainer component;
  iii) a threaded retainer aperture in a second side of the retainer component, opposite the first side and across the slot from said first side;
 d) a threaded retainer extending through the retainer aperture, the cutter aperture and the threaded retainer aperture to retain the cutter bit between in the slot of the retainer component, wherein the threaded retainer is detachably attachable to the retainer component to enable the cutter bit to be detachably attached to the retainer component;
 e) a bearing coupled to the extended end of the retainer component and wherein the bearing is cylindrical.

23. The cutter assembly of claim 22, wherein the bearing has a diameter of at least 15 mm.

24. The cutter assembly of claim 22, wherein the bearing has a diameter of at least 30 mm.

25. The cutter assembly of claim 22, wherein cutter bit is a flush cutter having parallel first second cutting edges.

* * * * *